United States Patent [19]

Pastor et al.

[11] Patent Number: 4,578,252

[45] Date of Patent: Mar. 25, 1986

[54] METHOD FOR PREPARING ULTRA-PURE ZIRCONIUM AND HAFNIUM TETRAFLUORIDES

[75] Inventors: Ricardo C. Pastor, Manhattan Beach; Morton Robinson, Agoura, both of Calif.

[73] Assignee: Hughes Aircraft Company, El Segundo, Calif.

[21] Appl. No.: 734,008

[22] Filed: May 14, 1985

[51] Int. Cl.$^4$ .................... C01G 25/04; C01G 27/04
[52] U.S. Cl. .................... 423/76; 423/72; 423/77; 423/84; 423/86; 423/489; 423/492
[58] Field of Search ............ 423/492, 493, 497, 490, 423/486, 489, 495, 71, 72, 75, 76, 77, 84, 86

[56] References Cited

U.S. PATENT DOCUMENTS

| | | | |
|---|---|---|---|
| 2,602,725 | 7/1952 | Wilhelm et al. | 423/489 |
| 2,608,464 | 8/1952 | Aagaard et al. | 423/492 |
| 2,618,531 | 11/1952 | Lindblad et al. | 423/77 |
| 2,687,340 | 8/1954 | Wainer | 423/72 |
| 2,805,121 | 9/1957 | Woolf | 423/489 |
| 2,899,269 | 8/1959 | Katz et al. | 423/492 |
| 3,067,112 | 12/1962 | Trumpler | 423/492 |
| 3,702,883 | 11/1972 | Craigen et al. | 423/489 |
| 4,399,118 | 8/1983 | Fennemann | 423/489 |

*Primary Examiner*—John Doll
*Assistant Examiner*—Anthony McFarlane
*Attorney, Agent, or Firm*—John A. Sarjeant; Anthony W. Karambelas

[57] ABSTRACT

A method for preparing ultra-pure metal tetrafluorides in which 3d such as Fe impurities are separated from impure material by a combined vaporization-electrolytic separation procedure. Sublimation and distillation methods are disclosed in combination with electrolytic separation by both emf-series displacement (ESD) and direct melt electrolysis (DME).

17 Claims, No Drawings

METHOD FOR PREPARING ULTRA-PURE ZIRCONIUM AND HAFNIUM TETRAFLUORIDES

RIGHTS OF THE UNITED STATES GOVERNMENT

The Government has rights in this invention pursuant to Government Contract No. N00014-83-C-2097, awarded by the Department of the Navy.

TECHNICAL FIELD

The present invention relates generally to methods for preparing ultra-pure heavy-metal fluorides from commercially available heavy-metal fluorides. More particularly, the present invention relates to a method for removing transition metal impurities from zirconium and hafnium tetrafluorides to provide ultra-pure materials which are suitable for use in IR transmission systems.

BACKGROUND OF THE INVENTION

Fluorozirconate and fluorohafnate glasses are unique nonoxide materials which include zirconium tetrafluoride and hafnium tetrafluoride, respectively, as major constituents. These multicomponent glasses are commonly referred to as the heavy-metal fluoride glasses.

The heavy-metal fluoride glasses have been found to have certain desirable physical and chemical characteristics which make them ideally suited for a wide variety of applications in optical systems. Heavy-metal fluoride glasses are prime candidates for use as optical-fibers for communications or transmission of optical power. A survey of the development of heavy-metal fluoride glasses, their properties and their uses is set forth by Martin G. Drexhage in Chapter 4 of the *Treatise on Materials Science and Technology*, Vol. 26 (1985) pages 151-243. The contents of this chapter are hereby incorporated by reference.

Millions of dollars are being spent each year to develop heavy-metal fluoride glasses specifically for IR fiber optic applications. The successful utilization of such fibers hinges on high optical quality in the IR range and superior mechanical properties of the fluorozirconate or fluorohafnate glass.

In order to achieve good optical transmission (less than 0.1 dB/km absorption) in the near-IR (2-5 micrometer) through optical fibers made from zirconium or hafnium tetrafluoride based glasses, the transition-ion content ($Fe^{+2}$, $Cu^{+2}$, $Ni^{+2}$, and $Cr^{+3}$) must be in the parts per billion (ppb) range. The anion impurity level ($OH^-$ and $O^{-2}$) must also be correspondingly low in order to achieve desired IR transmission characteristics.

Commercially available zirconium and hafnium tetrafluorides generally have cation anion and carbon contaminant levels which are unacceptably high. Accordingly, it is necessary to purify these two metal tetrafluoride commercial materials prior to their use in fabrication of the various heavy-metal fluoride glasses. We have had success in the past at reducing the anion concentration in commercial materials to acceptable levels by reactive atmosphere processing (RAP) utilizing carbon tetrachloride and hydrogen fluoride. See U.S. Pat. No. 4,341,873 issued on July 27, 1982, which is assigned to the same assignee as the present application.

Removal of the cation impurities present in commercially available zirconium and hafnium tetrafluorides has proved to be more difficult. This has been especially true for the removal of Fe impurities.

Sublimation and distillation are separation techniques which have been used to purify heavy-metal halides, such as zirconium and hafnium tetrafluorides. These separation techniques are for the most part satisfactory for removing the majority of cation impurities found in commercially received material, such as the alkaline earth and 4f impurities. However, sublimation and/or distillation have been only partially effective in removing Fe impurities due to the relatively high vapor pressure of $Fe^{+3}$. During sublimation or distillation of the zirconium or hafnium tetrafluoride, the concentration of the impurities increases in the remaining solid or liquid material so that vaporization of the $Fe^{+3}$ begins to occur along with the zirconium or hafnium tetrafluoride to thereby contaminate the sublimate. In order to prevent iron from contaminating the sublimate or distillate, it is necessary to stop the sublimation or distillation after only part of the material has been vaporized. This is undesirable, of course, since the residue must be discarded even though a high percentage of the metal tetrafluoride remains in the residue. As a result, a substantial waste of material occurs. Further, the degree of purity obtainable by sublimation or distillation alone does not reduce the Fe content into the ppb range, i.e., below 1 ppm.

In view of the above, it would be desirable to provide an improved sublimation or distillation method which includes all the advantages of these two simple separation procedures, and also increases the efficiency of the methods by allowing removal of Fe impurities to ppb levels in a one step procedure.

SUMMARY OF THE INVENTION

In accordance with the present invention, an improved sublimation or distillation method is disclosed which provides purification of metal tetrafluorides in a simple, efficient single step process which produces an ultra-pure metal tetrafluoride having iron impurity concentrations of below 1 ppm.

As a feature of the present invention, the electromotive series displacement occurs as a result of contacting the metal tetrafluoride with zirconium metal thereby purifying zirconium tetrafluoride. This method of applying the electromotive force is commonly referred to as emf-series displacement (ESD).

As another feature of the present invention, the electromotive series displacement effect can be achieved by utilizing aluminum metal. The aluminum metal displaces iron cation in the melt during application of the emf. Aluminum metal is not optically active in the near IR range and does not affect the IR transmission qualities of metal tetrafluorides so that the small amount of aluminum which replaces iron in the metal tetrafluoride does not adversely affect the IR transmission characteristics of heavy-metal glasses made from the metal tetrafluoride purified according to this technique.

As a further feature of the present invention, prior to distillation, the metal tetrafluoride may be mixed with barium fluoride or other alkalinizing agent to provide a metal tetrafluoride solution from which ultra-pure metal tetrafluoride can be distilled.

The present invention is based on an improved method in which an electromotive force (emf) is applied to the metal tetrafluoride during and preferably prior to distillation or sublimation. The electromotive force is applied to the metal tetrafluoride to electrically plate out relatively volatile iron cation impurities in the impure zirconium or hafnium tetrafluoride to relatively non-volatile metal impurities wherein the non-volatile electrically deposited impurities remain in the impure metal tetrafluoride during the distillation or sublimation and are not vaporized and not subsequently condensed with the purified metal tetrafluoride. The preferred material to be treated is zirconium tetrafluoride.

The above discussed and many other features and attendant advantages of the present invention will become apparent as the invention becomes better understood by reference to the following detailed description.

DESCRIPTION OF THE PREFERRED EMBODIMENTS

The present invention is an improvement upon sublimation and distillation processes for purifying metal tetrafluorides (also known as heavy-metal fluorides), such as zirconium tetrafluoride and hafnium tetrafluoride. Zirconium tetrafluoride is the preferred metal fluoride since it is the primary component of most heavy-metal fluoride glasses. Low levels of transition ion contaminants are most undesirable for heavy-metal fluoride glasses. Accordingly, the following exemplary description will be limited to purification of zirconium tetrafluoride with it being understood that the method has application to other volatile heavy-metal fluorides.

The present method is designed to provide a simple and efficient single step purification process which can be used to separate cation impurities from commercially available zirconium tetrafluoride or zirconium tetrafluoride from other sources which have undesirably high levels of cation impurities. Although the method provide separation and removal of a wide number of cation impurities including alkaline earth and 4f elements, it is especially well suited for use in separating iron cation impurities, namely $Fe^{+2}$ and $Fe^{+3}$ applicable to $3^d$ ions, $Mn^{+2}$, $Ti^{+3}$, $Cr^{+3}$, $Co^{+2}$, etc. The following discussion will be limited to a discussion of purification of zirconium tetrafluoride with respect to removal of iron cations with it being understood that the method also is useful for purification of other cations and anions.

Zirconium fluoride is available commercially from various sources such as: Cerac Co., Milwaukee, Wis., British Drug House, Ltd. (BHD), Pool, England. Zirconium fluoride can also be made by treating zirconium oxide with hydrofluoric acid according to well known procedures.

Commercially available zirconium tetrafluoride generally has at least 4 ppm iron cation impurities and more typically includes iron levels of around 300 ppm or more. In accordance with present invention, the zirconium tetrafluoride is treated in a one-step distillation or sublimation to reduce the iron cation content of the distillate or sublimate to below 1 ppm and significantly reduce carbon content as well.

The present invention is an improvement on conventional distillation and sublimation processes for purifying zirconium tetrafluoride. One feature of the present invention basically involves applying an electromotive force (DME) to the impure zirconium tetrafluoride during the sublimation or distillation in order to convert the relatively volatile iron (Fe) cations to the relatively non-volatile Fe metal. The sublimation or distillation is typically carried out at temperatures around 1100° K. where the vapor pressure of zirconium tetrafluoride is 137 torr. The vapor pressure for $Fe^{+3}$ and $Fe^{+2}$ fluorides are 2.5 torr and 0.014 torr, respectively. By electrolytically converting Fe cations to Fe metal, the likelihood of vaporizing the Fe metal is drastically reduced due to the much lower vapor pressure of Fe metal.

As previously discussed, the continual vaporization of the zirconium tetrafluoride during the distillation or sublimation results in the gradual concentrating of the iron impurities in the remaining residue. This increase in iron concentration increases the effectiveness of the electromotive force in converting $Fe^{+3}$ or $Fe^{+2}$ to Fe metal. As a result, these two processes (vaporization and ESD or DME) combine synergistically to produce a distillate or sublimate which has a much lower Fe cation content than achievable by either vaporization separation or electrolytic separation alone.

Procedures for purifying materials by distillation and/or sublimation are well known and widely used. Any of the conventional procedures based on separation by vaporization from a liquid or solid phase may be used if suitably modified for treating zirconium fluoride. The zirconium tetrafluoride as received from commercial manufactures such as Cerac Co., is typically a solid. Zirconium tetrafluoride has a melting point of about 932° C. at 1.44 atm. At a temperature of 912° C., the solid zirconium tetrafluoride attains a pressure of 1 atmosphere (atm). For separations carried out at pressures no greater than 1 atm., the separation process is by vapor transport.

The present invention also has application to purifying zirconium and hafnium halides other than the tetrafluoride. The chloride, bromide and iodide forms of the heavy-metals may also be processed. These other halides also tend to sublimate at pressure below 1 atm. For instance, the vapor pressure of zirconium tetrachloride at its melting point is 6.34 atm. while the vapor pressure for zirconium tetrabromide at its melting point is 24.6 atm.

Whether the vapor separation is termed a "distillation" or "sublimation" will depend upon whether the vapor separation is from a liquid (distillation) or from a solid (sublimation). With regards to the present invention, it is not particularly important whether the separation is by distillation or sublimation. Sublimation is preferred for zirconium tetrafluoride ($ZrF_4$) by itself since it allows the vapor separation to be carried out at lower temperatures. However, mixtures of $ZrF_4$ with innocuous alkalinizing agents, such as $BaF_2$, $GdF_3$, $YF_3$ or $YbF_3$, typically melt prior to vaporization so that distillation of $ZrF_4$ from the solution occurs.

It was found that distilling $ZrF_4$ from a mixture of $ZrF_4$ and $BaF_2$ gives a distillate lower in Fe than that obtained through sublimation. The distillation technique reduces the sublimation tendency of $Fe^{+3}$, a good Lewis acid, when the residue is alkalinized with $BaF_2$. Moreover, the vapor pressure of $FeF_3$ and $FeF_2$ in the $ZrF_4/BaF_2$ solution are lowered as a consequence of Raoult's Law. Accordingly, distillation from suitable alkalinizing agents is preferred. The amount of alkalinizing agent mixed with $ZrF_4$ is preferably between about 50% by weight to 20% by weight.

Another feature of the present invention, electromotive series displacement (ESD), is preferably utilized. The preferred metals for ESD are zirconium or aluminum. Any metal may be used, however, so long as it does not adversely affect the distillation or introduce optically active contaminants into the product and also provides the desired emf. Suitable additional metals include: lithium and sodium. The metal may be in the form of metal pieces immersed in the $ZrF_4$ or, if desired, the crucible may be made from zirconium or have a zirconium coating. When aluminum is used for ESD, it is preferably molten.

Preferably, the distillation or sublimation is carried out under an inert atmosphere, such as helium or argon. It is preferred that electromotive series displacement occur sometime prior to actual vaporization of the $ZrF_4$ in order to initially reduce the $Fe^{+3}$ content as much as possible prior to vaporization. Preferably, the ESD should occur at least 30 min. prior to vaporization. The amount of emf, due to ESD or by conventional electrolysis (DME) can be varied depending upon the degree of plating out of $Fe^{+3}$ desired. With ESD, the extent of the displacement of impurities will be limited by the metal being used.

Examples of practice are as follows:

For the purpose of evaluating purification of $ZrF_4$ by sublimation, sufficient quantities were purchased from Cerac (99.5% pure) and EM Labs, Elmsford, N.Y., (BDH, special grade). Both types were gray in color, and microscopic examination revealed black particulate matter which was believed to be carbon dispersed throughout the powdered samples. Sublimation was carried out at 1100° K.

The sublimation was carried out in a conventional vapor separation apparatus having a graphite heating element to give a uniform hot zone up to the very top of an upright vitreous carbon (VC) crucible in which the impure material was placed. The temperature decreased sharply above the top of the crucible and this was where the sublimate was condensed and recovered. The sublimation enclosure was evacuated, purged, and slowly heated to the sublimation temperature in an atmosphere of 90% by volume He and 10% by volume HF over a 16-hour period. The temperature was controlled by a (graphite, boron-graphite) thermocouple situated a few millimeters from the heating element within the uniform hot zone. The sublimation temperature of 1100° K. was maintained for 5 hours to complete the transport of approximately 100 g. As shown in Table 1, one sublimation significantly reduces Fe in 99.5% Cerac $ZrF_4$ from 320 ppm to approximately 30 ppm, approximately a factor of 11.

TABLE 1

|  | Fe, ppm | Method |
|---|---|---|
| BDH (as received) | 4 | ZAA* |
| BDH (sublimed in HF - FVL-5) | 1.5 | ZAA |
| BDH (sublimation residue - FVL-5) | 1900 | ESA |
| CERAC (99.5% purity) | 320 | ESA |
| CERAC (99.5% purity - sublimed in HF) | ~30 | PEA |
| CERAC (99.5% purity - sublimation residue) | 11000 | ESA |
| Vitreous carbon crucible | 10 | ZAA |

*Max absolute error ±100%
ZAA = Zeeman Atomic Absorption
PEA = Plasma Emission Analysis
ESA = Emission Spectrographic Analysis Although sublimation does significantly reduce the Fe content of $ZrF_4$ to 30 ppm, this level of Fe contamination is still above acceptable limits for IR applications. As is known, the separation efficiency of sublimation/distillation process are proportional to the product of the fugacity and the concentration. The fugacity is proportional to the vapor pressure of the compounds and is, therefore, set by the operating temperature. The vapor pressure mismatch between $ZrF_4$ and the Fe impurity tends to be compensated by the progressive increase in the Fe concentration in the residue as sublimation progresses. Thus, a steady-state value in the ratio of partial pressures is attained at some point during the sublimation. At that point, further sublimation leads to a negative gain with respect to separation of $ZrF_4$ from Fe. To combat such a drawback, the yield per sublimation cycle is sacrificed by only partially subliming the $ZrF_4$. The low sublimation yield can be partially recovered by carrying out repeated sublimation cycles, however, this is time consuming and calculations show that even multiple pass sublimation alone cannot achieve an impurity reduction of Fe to below 1 ppm.

The same $ZrF_4$ treated in the above example was mixed with 99.99% pure $BaF_2$ to provide a solution having 70% by weight $ZrF_4$ and 30% by weight $BaF_2$. The solution was distilled at 800° C. in a dry HF atmosphere. The resulting distillate contained 1.5 ppm Fe. The purification ratio for this distillation was about 150 (320 ppm Fe×0.7/1.5 ppm Fe) which is an improvement by a factor of about 5 over the straight sublimation of $ZrF_4$. Accordingly, the distillation of $ZrF_4$ from a solution of $BaF_2$ or other alkalinizing agent such as $GdF_3$, $YF_3$ and $YbF_3$ is preferred. Even with the additional 5 fold increase in Fe cation removal from the purified product, the resulting $ZrF_4$ still has an Fe content (1.5 ppm) which is above the ppb levels necessary for use of the material in IR applications.

The same $ZrF_4$:$BaF_2$ mixture in the above example was distilled with pieces of Zr metal present in the solution. The purification of $ZrF_4$ by distillation from melts of $ZrF_4$-$BaF_2$ containing pure zirconium metal was found by ZAA to lower the Fe level in the distillate by more than a factor of 600, from 320 ppm to 0.5 ppm. This represents a further improvement in the performance factor when compared to the other examples above which are based on sublimation or distillation alone. Table 2 summarizes the results of these 3 examples and demonstrates the increased purification possible using a combined distillation/electrolytic separation. Further, Table 2 shows the results of repeated sublimations of $ZrF_4$(BDH) which show that reduction of Fe levels below 1.5–2.0 ppm is not possible by sublimation alone.

The example, described above demonstrates the electroplating nature of Zr metal when in contact with 3d fluorides, such as Fe. As previously mentioned, this is called electromotive series displacement (ESD). The standard redox potential, $\epsilon_T$, (T=1000° K.) for the fluorides of Fe as well as Co, Ni, and Cu are all considerably lower than 4 V. This is in contrast to $\epsilon_T$ for $ZrF_4$ and $BaF_2$ which are 4.065 and 5.360 V, respectively. Consequently, Zr metal plates out transition metals but not barium due to the magnitude of its potential. ESD is a preferred technique since no equipment is necessary to apply a voltage to the solution in order to plate out the Fe impurities. Instead of Zr metal pieces being immersed in the solution, a Zr metal crucible may be used to provide the desired plating out.

TABLE 2
IRON ANALYSIS - ZrF$_4$

| 99.5% ZrF$_4$ (Cerac Co.) $210/Kilo Supra-Pur BaF$_2$ (E.M. Labs) | | | | (BDH) ZrF$_4$ (Glass Component Grade) $4000/Kilo | | | |
|---|---|---|---|---|---|---|---|
| Material | Fe, ppm | Method | Yield, % | Material | Fe, ppm | Method | Yield % |
| ZrF$_4$ (as received) | 320 | ESA | — | As received | 4 | ZAA | — |
| First HF Sublimation | <100 (~30) | ESA (PEA) | 70 | First HF Sublimation | 1.5 | ZAA | >90 |
| Residue | 11000 | ESA | | Residue | 1900 | ESA | |
| ZrF$_4$—BaF$_2$ (HF Distillation) | 4 | ZAA | 50 | Second HF Sublimation | 2 | ZAA | >90 |
| ZrF$_4$—BaF$_2$—Zr (He Distillation) | 0.5 | ZAA | 50 | | | | |
| Vitreous Carbon Crucible | 10 | ZAA | | | | | |

ZAA = Zeeman Absorption Analysis - (REL Error - 50%, ABS Error - 200%)
ESA = Emission Spectrographic Analysis REL Error 20%
PEA = Plasma Emission Analysis ABS Error 100%

Another embodiment of the present invention involves the use of direct melt electrolyte (DME), previously discussed. With direct melt electrolysis, the upper limit for the emf will be that at which the ZrF$_4$ decomposes. Preferably, as large an emf as possible is applied in order to plate out as much Fe impurities as possible. Generally, the upper limit for the applied emf will be about 3.5 V at 1000° K. DME is conventional electrolyte in which an emf is produced by creating a voltage potential between an anode and a cathode. For every order of magnitude change in the concentration ratio of impurity, an emf drive of 2.303 RT/F (F=96485 Coul. per equivalent) must be provided which at 1000° K. is 0.20 V. However, it should be noted that at the point where the applied emf equals the decomposition potential of ZrF$_4$, further electrolysis is of no benefit due to decomposition of the ZrF$_4$.

To demonstrate the feasibility of the DME/distillation method, the following experiment was carried out: a melt of 70 wt% ZrF$_4$ (Cerac 99.5% pure) and 30 wt% Ba (Em-Supra pure grade) was prepared at 700° C. in a helium atmosphere using a vitreous carbon crucible. Typically, such a melt when solidified is green in color due to the contaminant FeF$_3$. A regulated Hewlett Packard dc power supply was interfaced with the crucible to make the crucible the cathode, and a platinum rod dipping into the metl was the anode. As the voltage was slowly increased from 1.0 to 2.9 V, Ohm's Law was followed and the current increased in a linear fashion from 0 to 100 mA. However, at 3 V a sudden surge in current to 200 mA was observed, and at that point we believe plating out of transition metals began.

Several observations were made during this experiment. First, after approximately 15 minutes of constant current flow (200 mA) at 3.2 V, the current slowly began to decrease, a strong indication of purification by the electrodeposition process. Second, rather than the typical green color of such a melt obtained under ordinary circumstances, this product was white except at the melt-crucible interface. In that region considerable discoloration was observed and is currently being studied by X-ray techniques. Third, the small quantity of distillate collected at the anode was analyzed by X-ray to be pure ZrF$_4$.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. In a method for separating iron impurities from an impure metal halide in which the impure metal halide is heated to a temperature sufficient to form a metal halide vapor, said vapor being separated from said impure metal halide and condensed to form purified metal halide having a reduced iron content, wherein the improvement comprises:

utilizing electromotive series displacement by contacting a melt containig the impure metal halide with a pure metal, said electromotive series displacement causing the plating out of 3d metal impurities.

2. An improved method according to claim 1 wherein said metal halide is a metal tetrafluoride.

3. An improved method according to claim 2 wherein said metal tetrafluoride is zirconium tetrafluoride.

4. An improved method according to claim 3 wherein said electromotive series displacement is induced by contacting zirconium metal with said zirconium tetrafluoride.

5. An improved method according to claim 3 wherein said zirconium tetrafluoride is a solid and said separation is carried out by sublimation.

6. An improved method according to claim 3 wherein barium fluoride is mixed with said zirconium tetrafluoride to provide a zirconium tetrafluoride solution wherein said purified zirconium tetrafluoride is distilled from said solution.

7. An improved method according to claim 2 wherein said electromotive series displacement is induced by contacting aluminum metal with said metal tetrafluoride.

8. An improved method according to claim 7 wherein said aluminum metal is molten.

9. An improved method according to claim 2 wherein said vaporization is carried out in an atmosphere consisting essentially of an inert gas and hydrogen fluoride.

10. In a method for separating iron impurities from an impure metal halide in which the impure metal halide is heated to a temperature sufficient to form a metal halide vapor, said vapor being separated from said impure metal halide and condensed to form a purified metal halide having a reduced iron content, wherein the improvement comprises:

applying an electromotive force to said impure metal halide during the vaporization of said impure metal halide, said electromotive force being sufficient to convert relatively volatile transition metal 3d impurities in said impure metal halide to relatively non-volatile 3d metal impurities, wherein said non-volatile 3d metal impurities remain in said impure metal halide during said separation and are not vaporized and condensed with said purified metal halide.

11. An improved method according to claim 10 wherein said metal halide is a metal tetrafluoride.

12. An improved method according to claim 11 wherein said metal tetrafluoride is zirconium tetrafluoride.

13. An improved method according to claim 11 wherein said electromotive force is applied to said metal halide by applying an electrical potential of up to about 4 volts between electrodes in contact with said metal tetrafluoride at 1000° K.

14. An improved method according to claim 12 wherein said zirconium tetrafluoride is a solid and said separation is carried out by sublimation.

15. An improved method according to claim 12 wherein barium fluoride is mixed with said zirconium tetrafluoride to provide a zirconium tetrafluoride solution wherein said purified zirconium tetrafluoride is distilled from said solution.

16. An improved method according to claim 11 wherein said vaporization is carried out in an atmosphere consisting essentially of an inert gas and hydrogen fluoride.

17. An improved method according to claim 13 wherein said metal tetrafluoride is contained in a vitreous carbon crucible and said electrodes include a platinum anode immersed in said metal tetrafluoride and wherein said vitreous carbon crucible functions as said cathode.

* * * * *